(12) United States Patent
Kaagman et al.

(10) Patent No.: US 10,792,877 B2
(45) Date of Patent: Oct. 6, 2020

(54) VALIDATION TOOL AND METHOD FOR VALIDATING OPTICAL EQUIPMENT

(71) Applicant: VMI HOLLAND B.V., Epe (NL)

(72) Inventors: Mattheus Jacobus Kaagman, Epe (NL); Jeroen Smeenk, Epe (NL); Niels Tielenburg, Epe (NL); John Van De Vrugt, Epe (NL)

(73) Assignee: VMI HOLLAND B.V. (NL)

( * ) Notice: Subject to any disclaimer, the term of this patent is extended or adjusted under 35 U.S.C. 154(b) by 683 days.

(21) Appl. No.: 15/542,373

(22) PCT Filed: Jan. 15, 2016

(86) PCT No.: PCT/NL2016/050036
§ 371 (c)(1),
(2) Date: Jul. 7, 2017

(87) PCT Pub. No.: WO2016/122311
PCT Pub. Date: Aug. 4, 2016

(65) Prior Publication Data
US 2017/0368777 A1    Dec. 28, 2017

(30) Foreign Application Priority Data
Jan. 27, 2015 (NL) .................................... 2014195

(51) Int. Cl.
*B29D 30/26* (2006.01)
*B29D 30/30* (2006.01)
(Continued)

(52) U.S. Cl.
CPC ......... *B29D 30/26* (2013.01); *B29D 30/0061* (2013.01); *B29D 30/244* (2013.01);
(Continued)

(58) Field of Classification Search
CPC .. B29D 30/26; B29D 30/0061; B29D 30/244; B29D 30/3007; B29D 30/3057;
(Continued)

(56) References Cited

U.S. PATENT DOCUMENTS 5,546,330 A    8/1996 Sergel et al. ............ G01B 7/04
6,508,896 B1 *  1/2003 Jao ..................... B29D 30/0061
                                                    156/64
(Continued)

FOREIGN PATENT DOCUMENTS

CN    1410258    4/2003    ............ B29D 30/08
CN    1966252    5/2007    ............ B29D 30/26
(Continued)

OTHER PUBLICATIONS

Chinese Office Action issued in application No. 201680007556.0, dated Jan. 23, 2019 (6 pgs).
(Continued)

*Primary Examiner* — Hoa Q Pham
(74) *Attorney, Agent, or Firm* — Hayes Soloway P.C.

(57) ABSTRACT

Provided is a validation tool and a method for validating optical equipment that is used for measuring a plurality of characteristics of one or more tyre components during winding application of said tyre components around a tyre building drum, wherein a first tyre component of the one or more tyre components includes a first characteristic of the plurality of characteristics which, after measuring, is overlapped by the same or another tyre component of the one or more tyre components including a second characteristic of the plurality of characteristics, wherein the validation tool is provided with a first reference element that is arranged to represent the first characteristic and a second reference element that is arranged to represent the second characteristic, wherein the second reference element is offset with
(Continued)

respect to the first reference element to at least partially expose the first reference element.

29 Claims, 10 Drawing Sheets

(51) Int. Cl.
*B29D 30/00* (2006.01)
*B29D 30/24* (2006.01)

(52) U.S. Cl.
CPC ..... *B29D 30/3007* (2013.01); *B29D 30/3057* (2013.01); *B29D 2030/0066* (2013.01)

(58) Field of Classification Search
CPC ............ B29D 30/1607; B29D 30/1657; B29D 2030/428; B29D 2030/4456; B29D 2030/0066; B65H 26/06; B65H 26/08; G01B 11/02; G01B 11/06; G01B 11/0608; G01B 11/14; G01B 11/22
USPC ........... 356/601–635, 237.1–237.5; 156/117, 156/134, 202, 203, 351, 378; 700/122, 700/126; 702/155, 163
See application file for complete search history.

(56) References Cited

U.S. PATENT DOCUMENTS

| | | | | |
|---|---|---|---|---|
| 6,628,408 B1* | 9/2003 | Franklin | ............... | B29C 65/087 356/623 |
| 6,866,736 B2 | 3/2005 | Wright | .......................... | 156/123 |
| 7,177,740 B1* | 2/2007 | Guangjun | ................ | G01C 1/06 356/139.09 |
| 8,169,604 B2* | 5/2012 | Braghiroli | ............ | G01B 11/002 356/139.09 |
| 8,892,396 B2 | 11/2014 | Kostka et al. | ..... | B29D 30/3007 |
| 9,211,103 B2 | 12/2015 | Kraus et al. | ............. | A61B 6/00 |
| 9,322,642 B2 | 4/2016 | Kostka et al. | ......... | G01B 11/14 |
| 9,688,037 B2 | 6/2017 | Fischer et al. | ......... | B29D 30/16 |
| 9,738,044 B2* | 8/2017 | Marchini | ............. | B29D 30/244 |

| | | | | |
|---|---|---|---|---|
| 2001/0008162 A1 | 7/2001 | Shimizu et al. | ........ | B29D 30/00 |
| 2007/0107848 A1 | 5/2007 | Hayashi et al. | ............ | 156/394.1 |
| 2009/0171494 A1 | 7/2009 | Wachter et al. | ......... | G06F 17/00 |
| 2011/0202309 A1 | 8/2011 | Kostka et al. | ................ | 702/155 |
| 2015/0009510 A1* | 1/2015 | Kostka | ................... | G01B 11/06 356/625 |

FOREIGN PATENT DOCUMENTS

| | | | | |
|---|---|---|---|---|
| CN | 102186660 | 9/2011 | ......... | B29D 30/3007 |
| CN | 103660294 | 3/2014 | ............. | B29C 65/54 |
| EP | 0530673 | 3/1993 | ............. | B29D 30/30 |
| EP | 2328746 | 7/2012 | ............. | B29D 30/30 |
| JP | H01197609 | 8/1989 | ............. | B29C 53/72 |
| JP | H0584849 | 4/1993 | ............. | B29C 65/78 |
| JP | H095246 | 1/1997 | ............. | G01N 21/88 |
| JP | 2002036386 | 2/2002 | ............. | B29D 30/32 |
| JP | 2002168609 | 6/2002 | ............. | G01B 11/24 |
| JP | 2003315026 | 11/2003 | ............. | G01B 11/24 |
| JP | 2004354258 | 12/2004 | ............. | B29D 30/08 |
| JP | 2012171253 | 9/2012 | ............. | B29D 30/30 |
| JP | 2015536844 | 12/2015 | ............. | B29D 30/16 |
| KR | 20040046510 | 6/2004 | ............. | B29D 30/30 |
| RU | 2247656 | 3/2005 | ............. | B29D 30/30 |
| SU | 431084 | 6/1974 | ............. | B29D 30/30 |

OTHER PUBLICATIONS

Russian Decision to Grant issued in application No. 2017126707, dated Mar. 27, 2019 (8 pgs).
International Search Report issued in corresponding PCT Patent Application Serial. No. PCT/NL2016/050036 dated May 3, 2016 (4 pages).
Written Opinion of the International Searching Authority issued in corresponding PCT Patent Application Serial No. PCT/NL2016/050036 (5 pages).
Japanese Office Action (w/translation) issued in application No. 2016-559650 dated Nov. 7, 2017 (7 pgs).
Decision to Grant (w/translation) issued in related Japanese Patent Application Serial No. 2016-559650, dated Jul. 24, 2018 (6 pgs).
Taiwan Office Action (w/machine translation) issued in application No. 105101382, dated Sep. 3, 2019 (14 pgs).

* cited by examiner

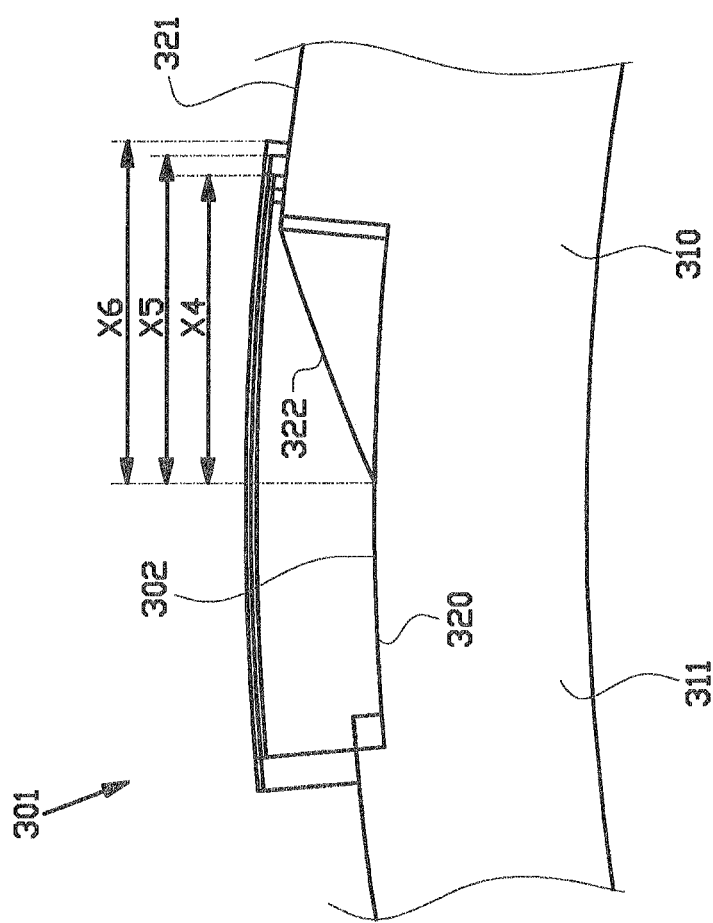

VALIDATION TOOL AND METHOD FOR VALIDATING OPTICAL EQUIPMENT

BACKGROUND

The invention relates to a validation tool and a method for validating optical equipment, in particular optical equipment used in the tyre building industry.

In the tyre building industry, rubber components are wound around a drum to form a green tyre, as shown in FIGS. 1A and 1B. Each rubber component has a leading end LE that is applied to the drum first and a trailing end TE that after one full revolution of the drum is spliced to the leading end with an overlap X between the trailing end TE and the leading end LE. It is important for a tyre manufacturer to know the length of the overlap X, as this influences the quality of the tyre design. To determine the length of the overlap X at the splice S, optical equipment is provided to measure the angular position of the leading end LE prior to splicing, see FIG. 1A, and the angular position of the trailing end TE after splicing, see FIG. 1B. The length of the overlap X is determined by calculating the difference between the two measured angular positions after a full revolution of the drum.

The determination of the length of the overlap X at the splice S, as presented above, is reliant on the assumption that the optical equipment is correctly calibrated and provides consistent measuring results. A common way to validate the consistency of the measuring results is to repeat the measurements. However, repeating the measurements for the same tyre component is impossible, as the trailing end TE and the leading end LE are securely spliced together and the leading end LE can not be exposed again without destructive measures, e.g. pulling the green tyre apart. Tearing the splice S apart is meaningless anyway, as there is no way to be sure that the trailing end TE and the leading end LE are still representative of their position in the splice S after tearing. Consecutively measuring a series of tyre components prior to and after splicing is not an option as each tyre component is slightly different. Hence, in the state of the art, there is no viable option to validate the optical equipment.

It is an object of the present invention to provide a validation tool and method for validating optical equipment.

SUMMARY OF THE INVENTION

According to a first aspect, the invention provides a validation tool for validating optical equipment that is used for measuring a plurality of characteristics of one or more tyre components during winding application of said tyre components around a tyre building drum, wherein a first tyre component of the one or more tyre components comprises a first characteristic of the plurality of characteristics which, after measuring, is overlapped by the same or another tyre component of the one or more tyre components comprising a second characteristic of the plurality of characteristics, wherein the validation tool is provided with a first reference element that is arranged to represent the first characteristic and a second reference element that is arranged to represent the second characteristic, wherein the second reference element is offset with respect to the first reference element to at least partially expose the first reference element.

With the first reference element exposed, both the first reference element and the second reference element can be repeatedly measured. Thus, comparable, consecutive measurements can be obtained to prove the accuracy and/or calibration of the optical equipment and/or to reliably verify or validate the optical equipment can be reliably.

In an embodiment the second reference element is offset with respect to the first reference element in a direction corresponding to the circumferential direction of the tyre building drum. The first reference element and the second reference element can thus be distributed in the circumferential direction over the validation tool.

In an alternative embodiment the second reference element is offset with respect to the first reference element in a direction parallel to the axial direction of the tyre building drum. The first reference element and the second reference element can thus be distributed in the axial direction over the validation tool.

In a preferred embodiment of the validation tool, the first characteristic is the leading end of the first tyre component. Preferably, the first reference element comprises a first reference edge which is arranged to represent a leading edge of the leading end and which is detectable by the optical equipment. This allows for the verification or validation of the optical equipment for measurements of the leading end.

In an embodiment the tyre building drum comprises a drum shaft and a circumferential surface extending concentrically around the drum shaft at a first radius, wherein the validation tool comprises a first reference surface extending at a second radius that is greater than the first radius, wherein the first reference element is provided with a first gap or a recess in the first reference surface, wherein the first reference edge is formed at a boundary of said first gap or recess. The gap or recess can make the first reference edge more distinct with respect to the first reference surface and thus more detectable by the optical equipment.

In an embodiment the first gap or recess extends into the first reference surface down to the first radius. The bottom of the first gap or recess can thus represent the circumferential surface of the tyre building drum.

In an embodiment the first gap or recess is arranged to represent an open splice between the leading end and the trailing end of the first tyre component. Preferably, the first gap or recess is further bounded by a first auxiliary edge which extends parallel to the first reference edge at the second radius and which is detectable by the optical equipment, wherein the distance between the first reference edge and the first auxiliary edge represents the width of the represented open splice. This allows for the verification or validation of the optical equipment for measurements of an open splice.

In an alternative embodiment the first reference element comprises a reference slope which is arranged to represent a sloping leading end and which is detectable by the optical equipment. The reference slope can represent sloping leading edges, such as a leading edge that has been created by cutting the leading end with a ultrasonic knife at a very sharp angle, e.g. less than 20 degrees, with the plane of the tyre component.

In an embodiment the second characteristic is the trailing end of the first tyre component. Preferably, the second reference element comprises a second reference edge which is arranged to represent a trailing edge of the trailing end and which is detectable by the optical equipment. This allows for the verification or validation of the optical equipment for measurements of the trailing end.

In an embodiment the second reference element comprises a second reference surface extending at a third radius that is greater than the second radius, wherein the wherein the second reference edge is formed at a boundary of said second reference surface. The second reference surface can represent the part or area at or near the trailing end of the first tyre component that normally overlaps the leading end. The second reference edge can be distinctly formed at the end of said second reference surface to be detectable by the optical equipment.

In an embodiment the first tyre component is cut under a cutting angle, wherein the first reference element and the second reference element extend along helical paths with a pitch that is representative of or equal to said cutting angle. The first reference element and the second reference element can thus represent their respective characteristics across the respective helical paths.

In an embodiment the validation tool comprises a first group of reference elements, including at least the first reference element and the second reference element, wherein the validation tool further comprises a second group of reference elements that are mirror symmetrical to the reference elements of the first group. The first and second groups may represent a variety of characteristics, such as a clockwise and counterclockwise windings or tyre components with different cutting angles.

In an embodiment the validation tool comprises side references which are detectable by the optical equipment and which are arranged to represent the sides of the first tyre component. This allows for the verification or validation of the optical equipment for measurements of the sides of the first tyre component. In addition, verification or validation of the optical equipment for measurements of the width of the first tyre component can be facilitated.

In an embodiment the first reference element and the second reference element intersect with the side references to form a triangular leading tip area and a triangular trailing tip area representative of the leading tip and the trailing tip, respectively, of the first tyre component. This allows for the verification or validation of the optical equipment for measurements of said leading tip and trailing tip.

In an embodiment the first reference element and the second reference element are offset in the circumferential direction over an offset angle in the range of 30 to 50 degrees, and preferably approximately 40 degrees. The reference element can therefore be sufficiently spaced apart to not interfere with the measurements taken at the individual reference elements.

In an embodiment the validation tool is provided with a third reference element comprising a second gap in the first reference surface, wherein the second gap is arranged to represent an alternative open splice between the leading end and the trailing end of the first tyre component. Preferably, the second gap is bounded by a second auxiliary edge and a third auxiliary edge which extends parallel to the second auxiliary edge, both detectable by the optical equipment, wherein the distance between the second auxiliary edge and the third auxiliary edge is different from the distance between the first reference edge and the first auxiliary edge and represents the width of the alternative open splice. This allows for the verification or validation of the optical equipment for measurements of a variety of open splices.

In a further embodiment the validation tool comprises a third or further reference elements that are arranged to represent an alternative or further alternative trailing ends with different overlap distances with respect to the leading end than the trailing end as represented by the second reference element, wherein the third or further reference elements are offset with respect to both the first reference element and the second reference element in a direction parallel to the axial direction of the tyre building drum. This allows for the verification or validation of the optical equipment for measurements of various different overlap distances.

In an embodiment the validation tool comprises an annular body that is arranged to be fitted around the tyre building drum. The validation tool can thus be fitted in the same axial position as the tyre components which it is supposed to represent.

In an alternative embodiment the validation tool comprises a body that is arranged to be mounted in the axial direction alongside the tyre building drum to extend generally in one radial direction of the tyre building drum towards the circumferential surface of the tyre building drum to form a splice validation area. The validation tool can thus be placed to the side of the tyre building drum and can be observed by the optical equipment independently of the tyre building drum. Optionally, the validation tool can even be kept in place at the side of the tyre building drum while the drum is in operation.

According to a second aspect, the invention provides an assembly of a tyre building drum and the aforementioned validation tool, wherein the tyre building drum comprises a drum shaft and a circumferential surface extending concentrically around the drum shaft, wherein the circumferential surface is arranged for supporting the one or more tyre components, wherein the validation tool is mounted in a validation position relative to the tyre building drum in which the first reference element and the second reference element are radially at substantially the same position as the respective characteristics which they are arranged to represent. In said validation position, the validation tool can accurately represent the tyre component and its characteristics for verifying or validating the optical equipment.

In an embodiment the validation tool comprises an annular body that is fitted around the tyre building drum. The validation tool can thus be fitted in the same axial position as the tyre components which it is supposed to represent.

In an embodiment the validation tool comprises a body that is mounted in the axial direction alongside the tyre building drum and extends generally in one radial direction of the tyre building drum towards the circumferential surface of the tyre building drum to form a splice validation area. The validation tool can thus be placed to the side of the tyre building drum and can be observed by the optical equipment independently of the tyre building drum. Optionally, the validation tool can even be kept in place at the side of the tyre building drum while the drum is in operation.

In a preferred embodiment the tyre building drum is arranged to be movable in the axial direction defined by the drum shaft, wherein the validation tool is arranged to be movable in the axial direction together with the tyre building drum into the viewing range of the optical equipment. Thus, the validation tool and the tyre building drum can be alternated into and out of the viewing range of the optical equipment.

According to a third aspect, the invention provides a method for validating optical equipment with the aforementioned validation tool, wherein the method comprises the steps of providing the validation tool in a validation position relative to the tyre building drum, using the optical equipment to obtain measurements from the first reference element and the second reference element and repeating the measurements to validate the optical equipment. By repeating the measurements, comparable measurements can be obtained, which can be used to prove the accuracy and/or calibration of the optical equipment and thereby verify or validate said optical equipment.

In an embodiment the method further comprises the step of virtually superimposing the measurements of the second reference element onto the measurements of the first reference element to arrive at a virtual splice. By superimposing the measurement results, the measurements are not simply individual measurements of the reference elements of the validation tool, but can be related to each other as if the characteristics which the reference elements are supposed to represent were actually spliced in a splice.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 13 shows a side view of a detail of the fourth validation tool according to FIG. 11.

DETAILED DESCRIPTION OF THE INVENTION

Figure 2:
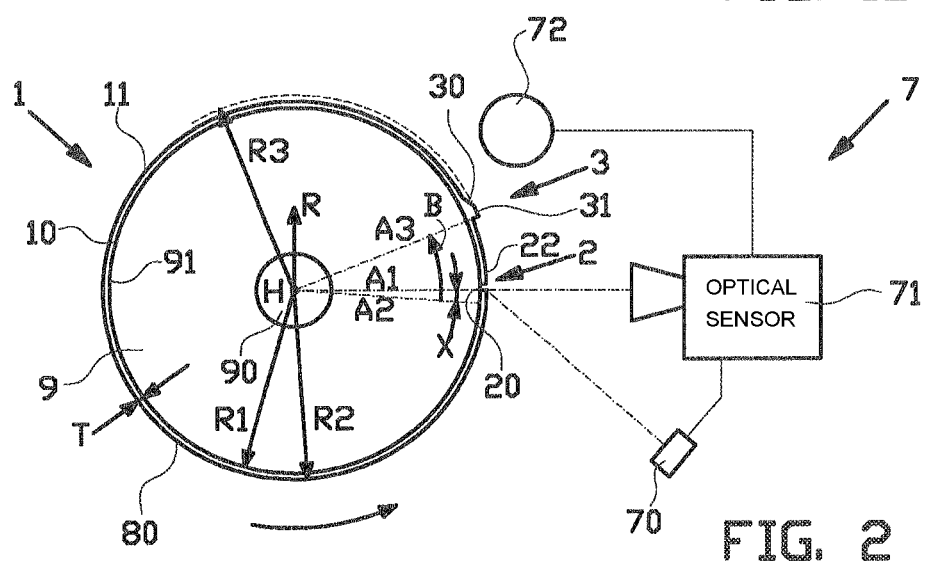
FIG. 2 shows a first validation tool and a method for validating optical equipment, according to a first embodiment of the invention.

FIG. 2 schematically shows a first validation tool 1 and a validation method according to a first embodiment of the invention. The first validation tool 1 and the validation method are used for verifying or validating optical equipment 7, in particular optical equipment 7 that is used in the tyre building industry for, in a manner known per se, measuring a plurality of characteristics of one or more rubber, rubberized or elastomeric tyre components that are being applied to a tyre building drum 9 to form a green tyre.

Figure 1A:
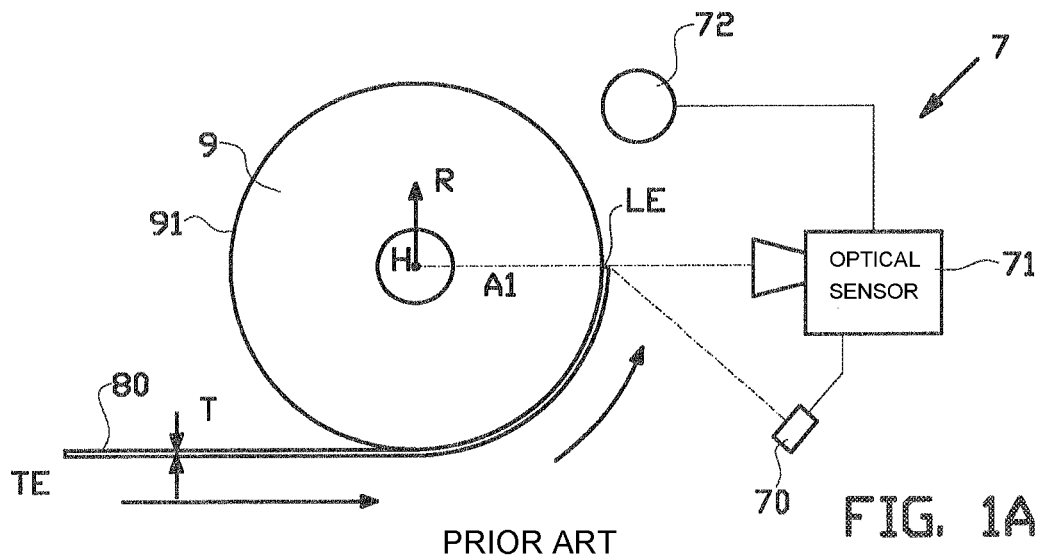
FIG. 1A shows a first step of a prior art method for measuring the leading end of a rubber component.
Figure 1B:
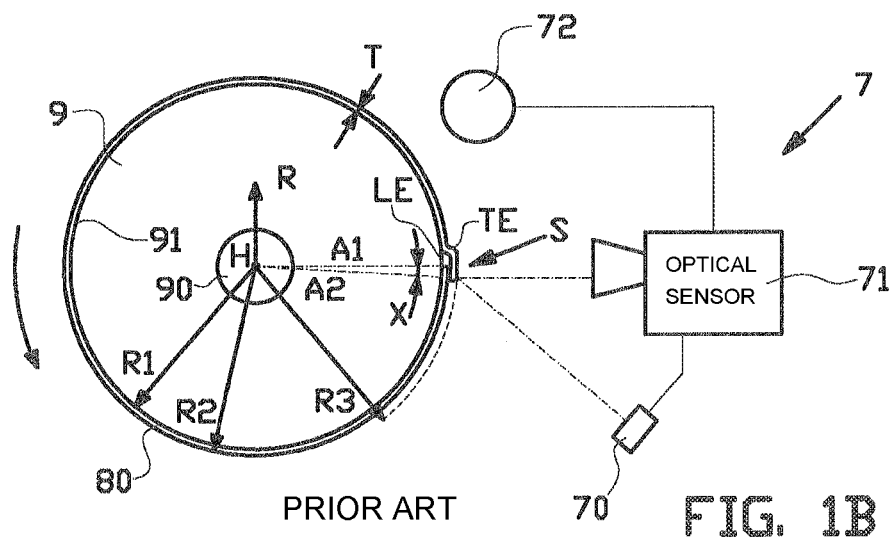
FIG. 1B shows a second step of the prior art method for measuring the trailing end of the rubber component.

FIGS. 1A and 1B show an exemplary prior art situation in which the optical equipment 7 is operational during the building of the green tyre for measuring a leading end LE and a trailing end TE of a tyre ply, layer or component 80, in particular a belt ply, a breaker ply or a tread. The tyre component 80 has a thickness T. The optical equipment 7 comprises a light source 70 for emitting light onto the tyre components to be measured and an optical sensor 71 for detecting light reflected by the tyre components. Preferably, the light source 70 is a laser light source for emitting a laser line. The leading end LE and the trailing TE of the tyre components are measured by detecting variations in height in the laser line.

A typical tyre component 80 is applied circumferentially to a tyre building drum 9 by winding, effectuated through rotation of the tyre building drum 9. The tyre building drum 9 has a drum shaft 90 defining a central rotational axis C, a longitudinal or axial direction L extending parallel to the central rotational axis C and a radially outward direction R originating from said central rotational axis C. The tyre building drum 9 is further provided with a circumferential surface 91 extending concentrically around the rotational axis C at a first radius R1 from the rotational axis C for supporting the tyre component 80 at said first radius R1. The optical equipment 7 is typically placed in a predetermined measuring position with respect to the tyre building drum 9. The optical equipment 7 is operationally coupled to or comprises an encoder 72 for determining the angular position of the tyre building drum 9 for each measurement.

During rotation of the tyre building drum 9 the optical equipment 7 detects or measures the leading end LE at a first angular position A1, see FIG. 1A, and the trailing end TE at a second angular position A2, see FIG. 1B. After one full revolution of the tyre building drum 9, the trailing end TE is spliced to the leading end LE, see FIG. 1B, with an overlap distance X between the trailing end TE and the leading end LE. As the rubber material of the tyre component 80 is still tacky, the trailing end TE adheres to the leading end LE at the overlap X. Optionally, the bonding between the trailing end TE and the leading end LE is further increased by rolling a pressing roller, e.g. a stitcher, over the trailing end TE. The trailing end TE forms a so called splice S with the leading end LE, which splice S can not be undone without destructive measures, e.g. tearing apart of the tyre component 80. Tearing the splice S apart is meaningless anyway, as there is no way to be sure that the trailing end TE and the leading end LE are still representative of their position in the splice S after tearing. The leading end LE is on the inside of the splice S at or near the trailing end TE in the radial direction R of the tyre building drum 9. To determine the length of the overlap X at the splice S, the difference between the two measured angular positions A1, A2, after a full or 360 degrees revolution of the tyre building drum 9, is calculated.

The first validation tool 1 and method as shown in FIG. 2 provide a viable way to verify or validate the aforementioned optical equipment 7. The first validation tool 1 is arranged to reliably represent a typical tyre component, like the tyre aforementioned tyre component 80 in FIG. 1B, during the validation method with the ability to consistently repeat the measurements to validate or verify the optical equipment 7.

To this end, the first validation tool 1 comprises a ring-shaped or annular body 10 with an inner radius that is equal to or substantially equal to the first radius R1. The first validation tool 1 is thus arranged to be fitted around the circumferential surface 91 of the tyre building drum 9 in a validation position in the same axial position as the tyre component 80 of FIG. 1B, which it is supposed to represent. The annular body 10 also generally has the same thickness T as the tyre component 80 which it is supposed to represent and has a radially outer surface 11 extending at a second radius R2 which is preferably equal to the first radius R1 plus the thickness T of the tyre component 80. The radially outer surface 11 forms a first reference surface of the first validation tool 1, representing the outer circumference of the tyre component 80 on top of the circumferential surface 91 of the tyre building drum 9 at or near the leading end LE.

The first validation tool 1 is provided with a first reference element 2 that is arranged to represent a first characteristic of the tyre component 80 of FIG. 1B, in this case the leading end LE, and a second reference element 3 that is arranged to represent a second characteristic of the tyre component 80 of FIG. 1B, in this case the trailing end TE.

The first reference element 2 is at a first angular position A1 corresponding to or representing the first angular position A1 of the leading end LE. The first reference element 2 is formed as a gap 20 in the thickness T of the annular body 10. The gap 20 is bounded by, forms or presents a first reference edge 21 and an auxiliary edge 22 in the outer surface 11 of the annular body 10, which first reference edge 21 and the auxiliary edge 22 are detectable or measurable by the optical equipment 7. The first reference edge 21, facing towards the second reference element 3, represents the leading edge of the leading end LE of the tyre component 80.

The second reference element 3 comprises a second reference surface 30 that is arranged to represent the part of the tyre component 80 at or near the trailing end TE, which in practice overlaps the leading end LE. In the direction of the first reference element 2, the second reference surface 30 gradually slopes or bulges outwards in the radial direction R at the position where, in practice, the rubber material is deformed as a result of the leading end LE being present on the circumferential surface 91 of the tyre building drum 9. The second reference surface 30 smoothes out at a third radius R3, which is equal to the second radius R2 plus the thickness T of the tyre component 80, above the outer surface 11 of the annular body 10. At the side of the second reference surface 30 facing the first reference element 2, the second reference surface 30 abruptly ends with a second reference edge 31 extending at the third radius R3 radially above the first reference element 2. This second reference edge 31 is detectable or measurable by the optical equipment 7 and is arranged to represent the trailing edge of the trailing end TE of the tyre component 80.

To prevent that the second reference element 3, and in particular its second reference surface 30, overlaps the first reference element 2 in the first angular position A1, as is the case with the trailing end TE and the leading end LE in practice, the second reference element 3 is offset with respect to the second angular position A2 over a known, preset or predetermined offset angle B with respect to the first reference element 2 in the angular or circumferential direction of the first validation tool 1 to at least partially expose the first reference element 2. In particular, the second reference element 3 is positioned in a third angular position A3 at an angle of 360 degrees with respect to the first angular position A1 plus the offset X and minus the offset angle B.

The second reference element 3 thus represents the trailing end TE as if the splicing already occurs at the third angular position A3, at the offset angle B spaced apart from where the splice S is actually formed in practice. The first reference element 2 at the first angular position A1 remains exposed and can be measured repeatedly. In the validation position of the first validation tool 1 on the tyre building drum 9, the first validation tool 1 is rotated together with the tyre building drum 9 in front of the optical equipment 7 between at least the first angular position A1 and the third angular position A3 to measure and/or detect the first reference element 2 in the first angular position A1 and the second reference element 3 in the third angular position A3. By knowing the offset angle B, the offset of the second reference element 3 with respect to the first reference element 2 can be virtually compensated, cancelled out or undone to arrive at a virtually superimposed or virtually spliced first reference element 2 and second reference element 3. In other words, the measurements from the second reference element 3 at the third angular position A3 can be virtually superimposed onto the measurements from the first reference element 2 at the first angular position A1 by offsetting the measurements from the second reference element 3 over the same offset angle B back into the second angular position A2.

FIGS. 3A, 3B, 4, 5 and 6A-6C show a second validation tool 101 according to a second embodiment of the invention. The second validation tool 101 is particularly used for verifying or validating optical equipment 7 that is normally used to measure tyre components 80 that have been cut under a breaker angle or cord angle, such that the leading end LE and the trailing end TE are shaped as triangular leading tip and trailing tip. Examples of such tyre components 80 are breaker plies, belt plies and other carcass components.

Figure 6A:
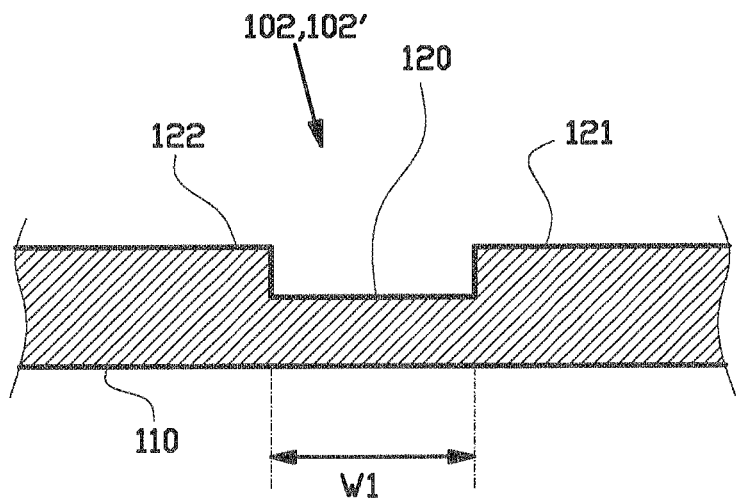
FIGS. 6A, 6B and 6C show details of the second validation tool in cross section according to the lines VI A, VI B and VI C, respectively, in FIG. 3A.

The second validation tool 101 is very similar to the first validation tool 101 in that it also has an annular body 110, an outer surface 111, a first reference element 102 and a second reference element 103. The second validation tool 101 further comprises grips or handlebars 112 to facilitate accurate and ergonomic placement of the first validation tool 101 around the tyre building drum 9. As shown in FIG. 6A, the first reference element 102 again is formed as a groove, profile or gap 120 presenting a first reference edge 121 representing the leading edge of the leading end LE and a first auxiliary edge 122. As shown in FIG. 6C, the second reference element 103 comprises a similar reference surface 130 and a second reference edge 131 representing the trailing edge of the trailing end TE.

Figure 3A:
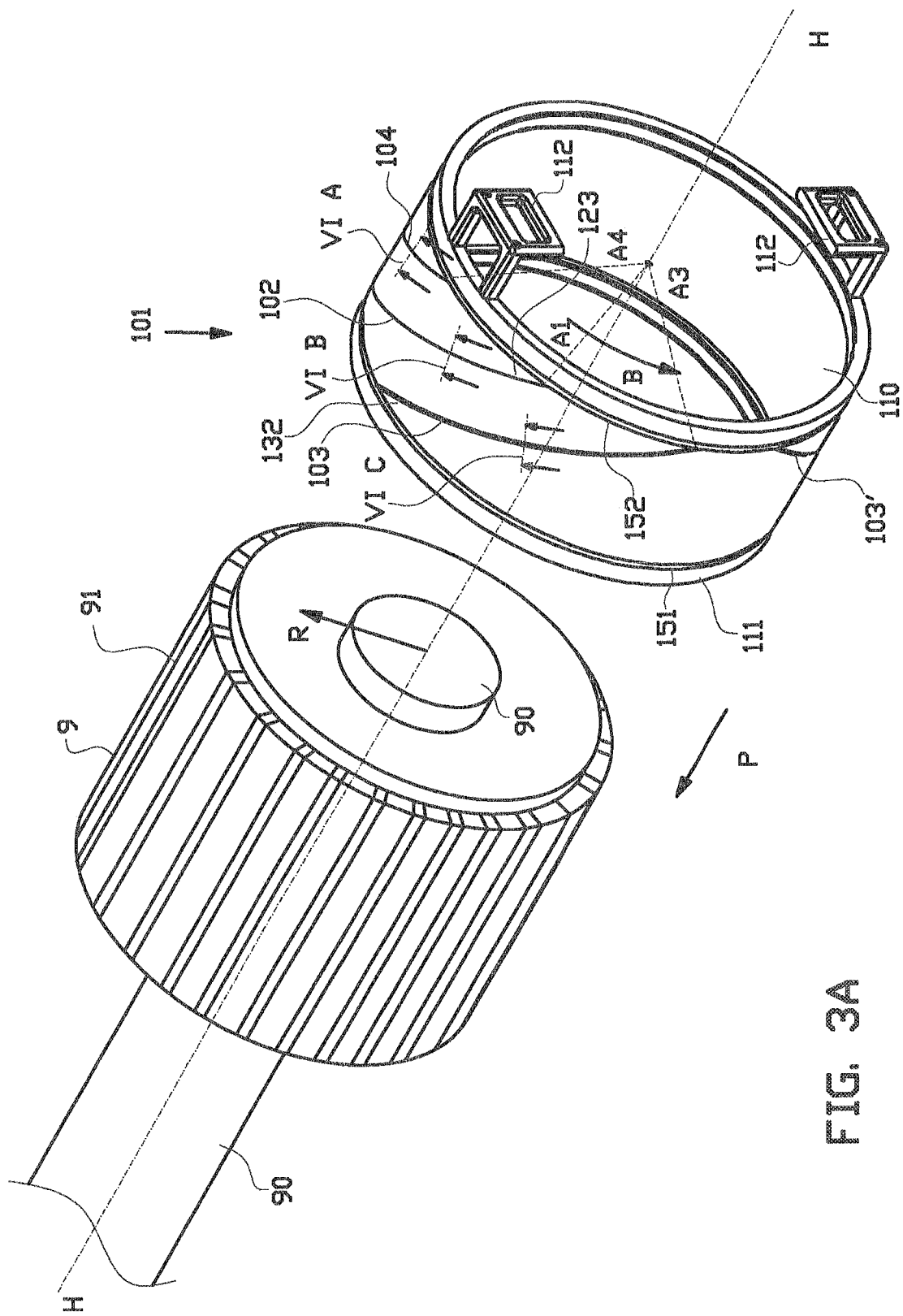
FIG. 3A shows a second validation tool according to a second embodiment of the invention.
Figure 3B:
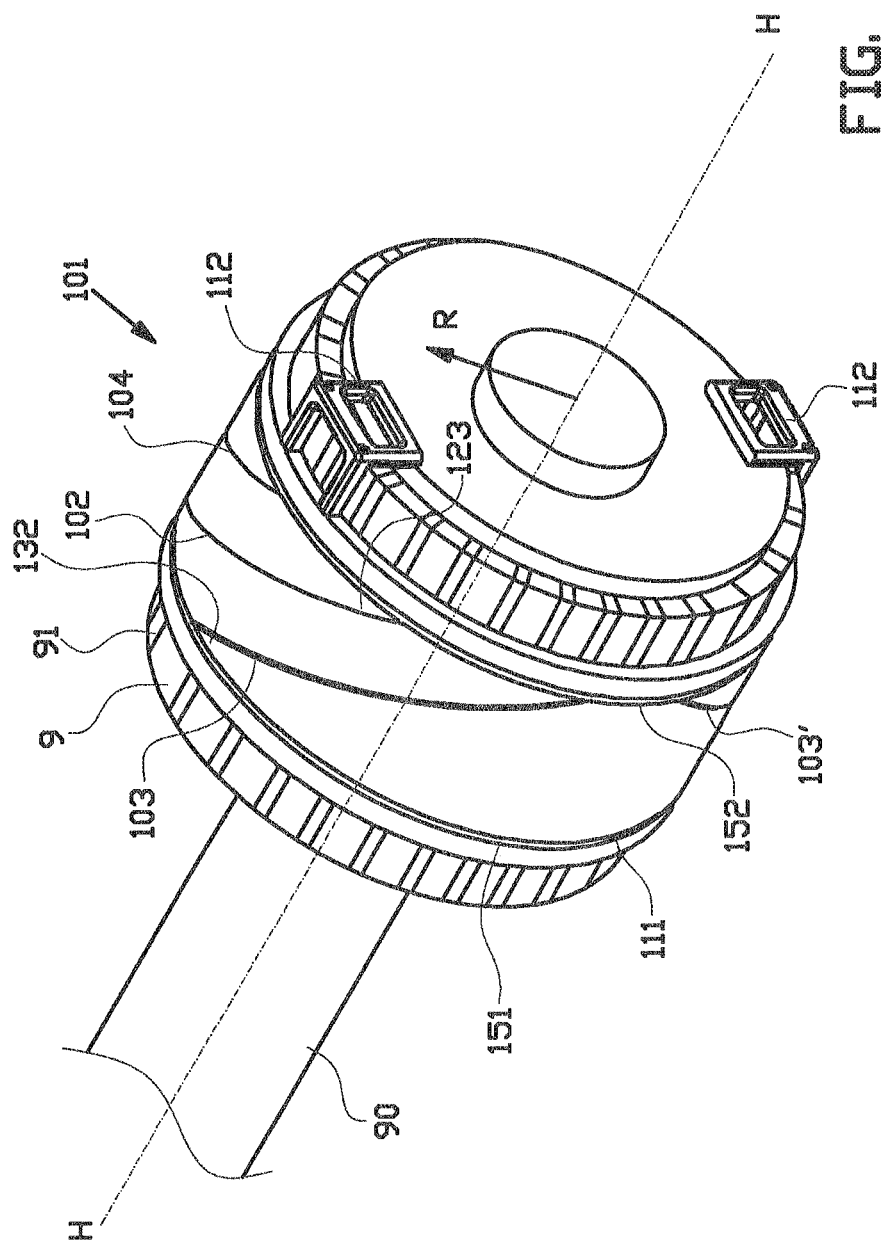
FIG. 3B shows the second validation tool of FIG. 3A when mounted on a tyre building drum.

As shown in FIGS. 3A and 3B, the first reference element 102 and the second reference element 103 of the second validation tool 101 extend along helical paths across the outer surface 111 of the annular body 110 that represent the helical paths of the leading end LE and the trailing end TE, respectively, across the circumferential surface 91 of the tyre building drum 9. The helical paths of the first reference element 102 and the second reference element 103 are arranged at a pitch that represents the cutting angle, e.g. the breaker angle or cord angle, at which the leading end LE and the trailing end TE, respectively, are cut.

The second validation tool 101 differs from the first validation tool 1 in that the gap 120 of the first reference element 102, as shown in FIG. 6A, is a first gap 120 that is arranged to not only present a first reference edge 121 that represents the leading edge LE, but to also or alternatively represent a so-called 'open splice'. An open splice is an unsuccessful splice, in which the leading edge LE and the trailing edge TE do not abut or overlap. The result is a gap between the leading edge LE and the trailing edge TE, as represented by the width W1 of the first gap 120.

Figure 6B:
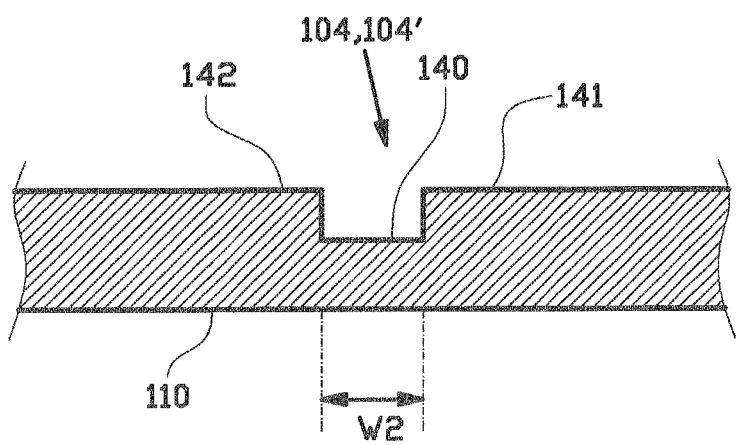
Figure 6C:
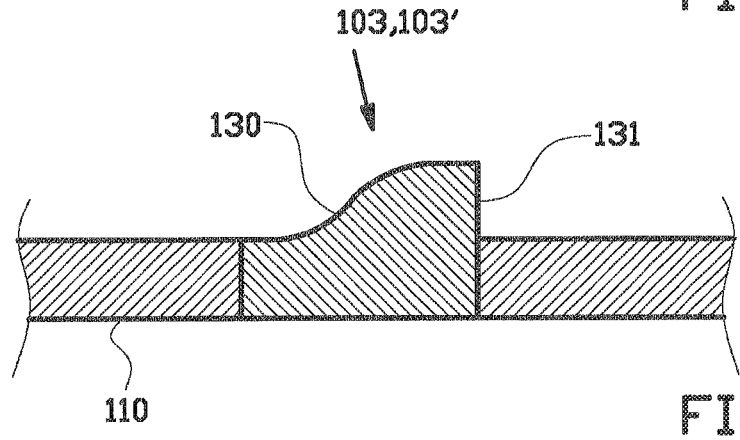

In this example, the second validation tool 101 further comprises a third reference element 104 with a second gap 140, as shown in FIG. 6B, that is arranged to represent an alternative open splice to the first gap 120 of FIG. 6A. The third reference element 104 is offset with respect to the first reference element 102 in the circumferential direction into a fourth angular position A4. The second gap 140 of the third reference element 104 also extends along a helical path across the outer surface 111 of the annular body 110, corresponding to a helical path of an alternative leading end (not shown in FIG. 1B). The gap 140 is bounded by, forms or presents a third reference edge 141 and a second auxiliary edge 142. The second gap 140 has a width W2 that is smaller, and preferably at least twice as narrow as the first gap 120. In this example, the first gap 120 has a first width W1 of approximately two millimeters. The second gap 140 has a second width W2 of approximately one millimeter. Thus, different types of open splices can be measured depending on the combination of the second reference element 103 with either the first reference element 102 or the third reference element 104.

In this exemplary embodiment, the second reference element 103 is offset with respect to the first reference element 103 in the circumferential direction of the second validation tool 101 over an angle in the range of 30 to 50 degrees and in particular approximately 40 degrees. The third reference element 104 is offset with respect to the first reference element 103 in the circumferential direction of the second validation tool 101 over an angle in the range of 30 to 50 degrees and in particular approximately 40 degrees, in a circumferential direction opposite to the offset of the second reference element 103 with respect to the first reference element 102. The angular positions A1, A3, A4 indicate the starting points of the helical paths of the respective reference elements 102, 103, 104. The respective reference elements 102, 103, 104 themselves extend along the respective helical paths as shown in FIGS. 3A and 3B over approximately 70 to 90 degrees, and in particular over approximately 85 degrees, of the circumference of the second validation tool 101. Preferably, the reference elements 102, 103, 104 are arranged in a first group such that their helical paths extend within one circular section of 180 degrees of the circumference of the second validation tool 101. As shown in FIGS. 3A, 3B, 4 and 5, the reference elements 102, 103, 104 extend within a first half or upper half of the second validation tool 101.

The second validation tool 101 is provided with a second group of reference elements 102', 103', 104', which are mirror symmetrical to the first reference element 102, the second reference element 103 and the third reference element 104, respectively. As shown in FIGS. 3A, 3B, 4 and 5, the second group of reference elements 102', 103', 104' extends within a second half or lower half of the second validation tool 101. The second group of reference elements 102', 103', 104' represent a tyre component (not shown) that is wound in an opposite circumferential direction onto the tyre building drum 9, or a tyre component (not shown) with different or opposite breaker angles or cord angles. In this particular example, the two groups represent clockwise and counter-clockwise windings of a tyre component.

Figure 4:
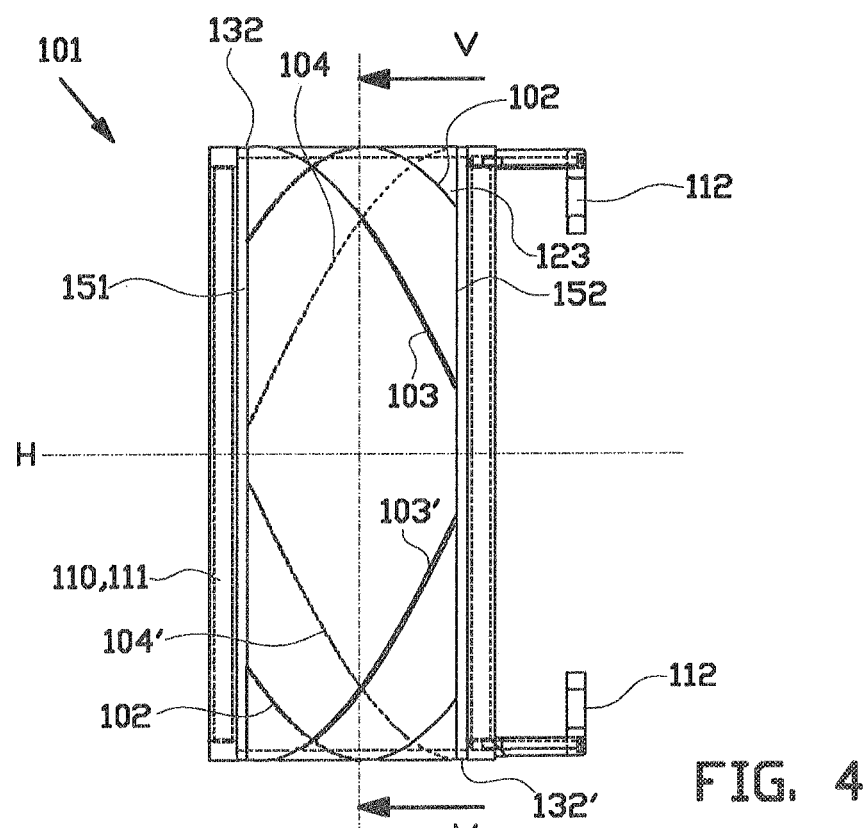
FIG. 4 shows a front view of the second validation tool according to FIGS. 3A and 3B.
Figure 5:
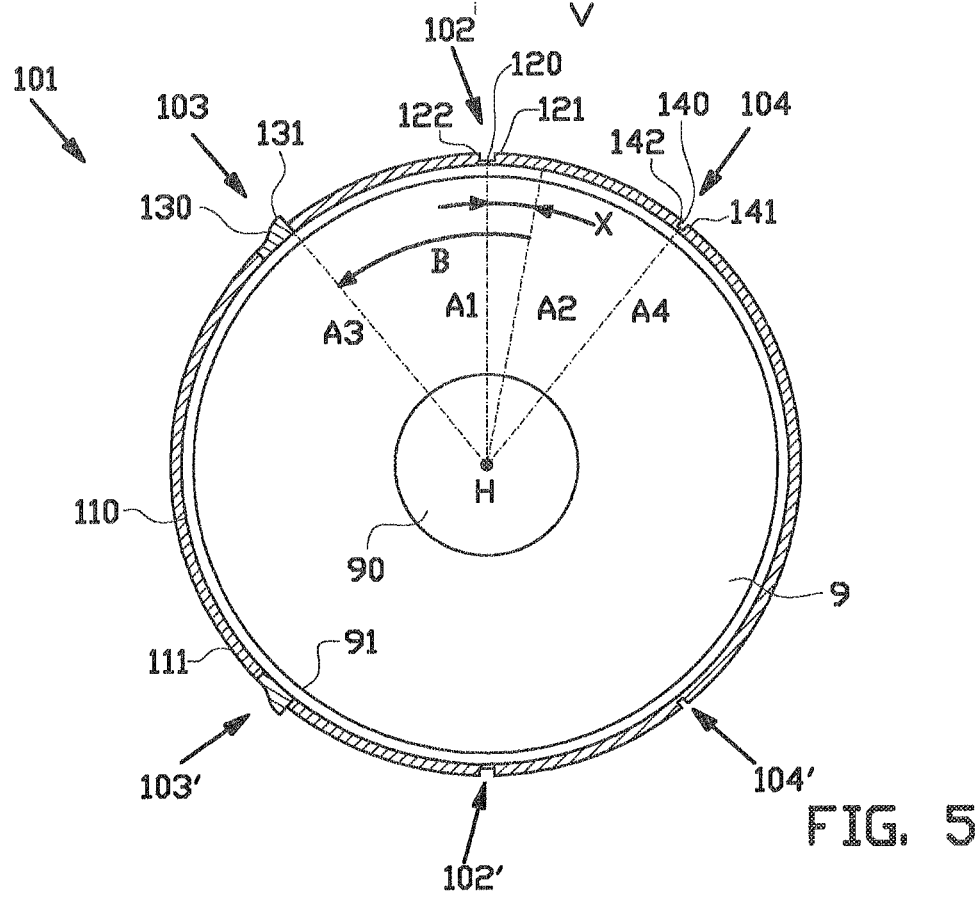
FIG. 5 shows a view in cross section of the second validation tool according to the line V-V in FIG. 4.

As shown in FIGS. 3A, 3B and 4, the second validation tool 101 is further provided with a first side edge 151 and a second side edge 152 extending circumferentially in the outer surface 111 of the second validation tool 101 for providing additional side references representing the side edges and/or the longitudinal edges of tire component 80 of FIGS. 1A and 1B in the axial direction L of the tyre building drum 9. The side edges 151, 152 intersect with the helically extending reference element 102, 103, 104 and form a triangular leading tip area 123 and a triangular trailing tip area 132, representing the triangularly shaped leading tip and the triangularly shaped trailing tip, respectively, at the leading end LE and the trailing end TE, respectively, of the tyre component 80 as shown in FIGS. 1A and 1B. From the side edges 151, 152 alone, measurements regarding the width of the tyre component 80 can be verified or validated. From the combination of the first side edge 151 and the second reference element 103, measurements regarding the trailing tip area 132 can be verified or validated. From the combination of the second side edge 152 and the first reference element 102, measurements regarding the leading tip area 123 can be verified or validated. In this example, the side edges 151, 152 are formed at the boundary of two circumferentially extending grooves.

The second validation tool 101 is arranged to be rotated together with the tyre building drum 9 in front of the optical equipment 7 as shown in FIGS. 1A and 1B over at least a half a revolution to measure and/or detect the helical paths of the first reference element 102, the second reference element 103 and the third reference element 104. Preferably, the second validation tool 101 is arranged to be rotated over a full revolution to also include the second group of reference elements 102', 103', 104'. Similarly to the first validation tool 1, the measurements obtained from the second validation tool 101 are virtually superimposed based on the known circumferential offsets between the reference elements 102, 103, 104 to determine, verify and/or validate the measurements of the overlap and other characteristics of the tyre component 80, such as open splices, width, the leading tip 123 and the trailing tip 132.

FIGS. 7, 8, 9 and 10 show a third validation tool 201 according to a third embodiment of the invention. The third validation tool 201 is particularly used for verifying or validating optical equipment 7 that is normally used to measure tyre components 80 which are cut off at a straight or perpendicular angle to their longitudinal direction. Examples of such tyre components 80 are treads and tread caps.

Figure 7:
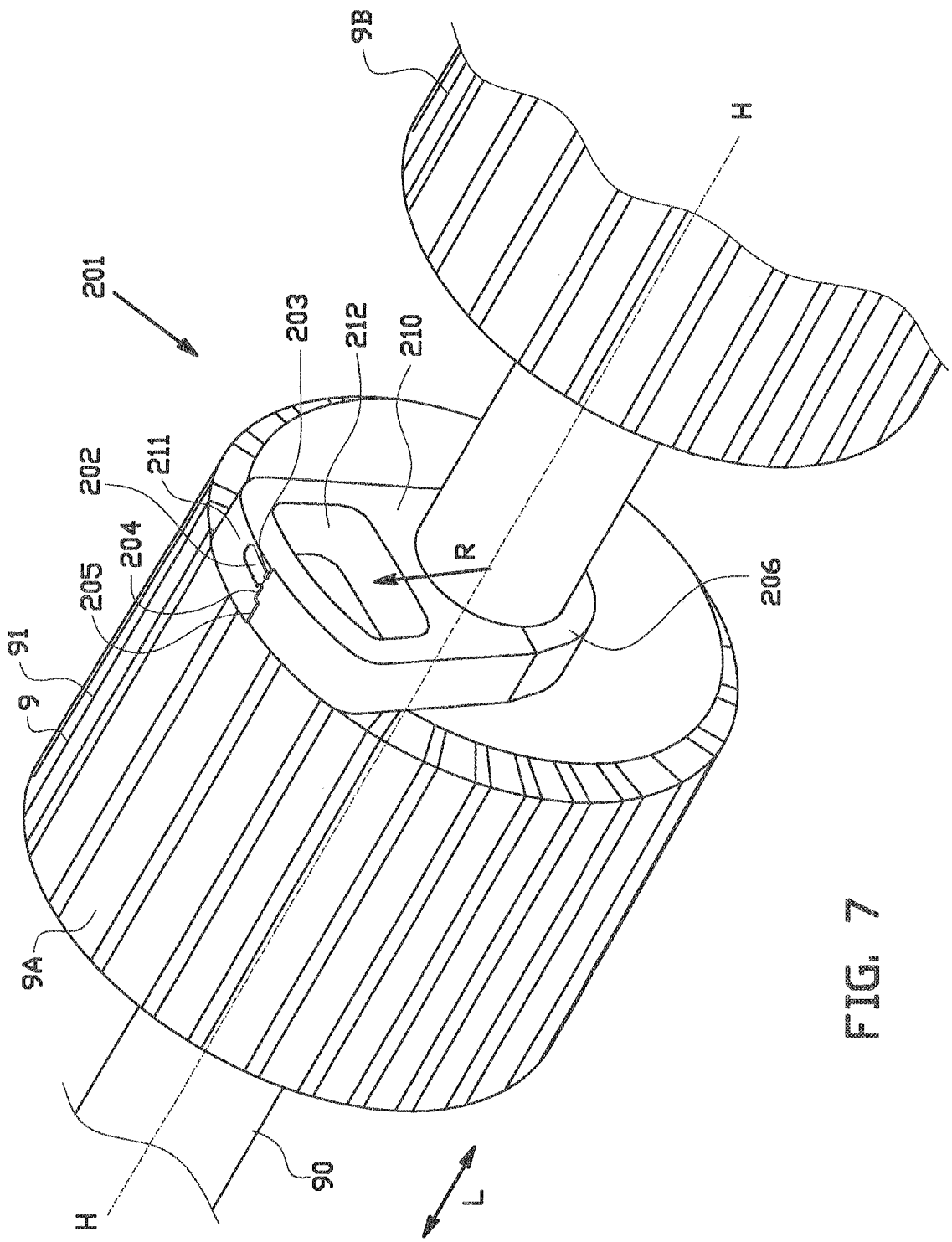
FIG. 7 shows a third validation tool according to a third embodiment of the invention.

As shown in FIG. 7, the third validation tool 201, contrary to the first validation tool 1 and the second validation tool 101, does not have an outer surface extending annularly around the drum shaft 90. Instead, the third validation tool 201 comprises a body 210 that is mounted to the drum shaft 90 and/or the tyre building drum 9 in a validation position in which the body 210 extends generally in one radial direction alongside the tyre building drum 9. In this particular example, the third validation tool 201 is used in combination with a carcass forming drum 9, comprising two drum halves 9A, 9B spaced apart in the axial direction of the drum shaft 90. The third validation tool 201 is mounted alongside one of the drum halves 9A.

At or near the circumferential surface 91 of the tyre building drum 9, the third validation tool 201 forms a partial circumferential surface or splice validation area 211 that only extends along a section, sector or area of the circumferential surface 91 of the tyre building drum 9 at which the splice to be measured occurs in practice. In this example, the splice validation area 211 covers a section or segment of the circular circumference of the circumferential surface 91 in a range of 20 to 90 degrees, and preferably less than 50 degrees.

Figure 9:
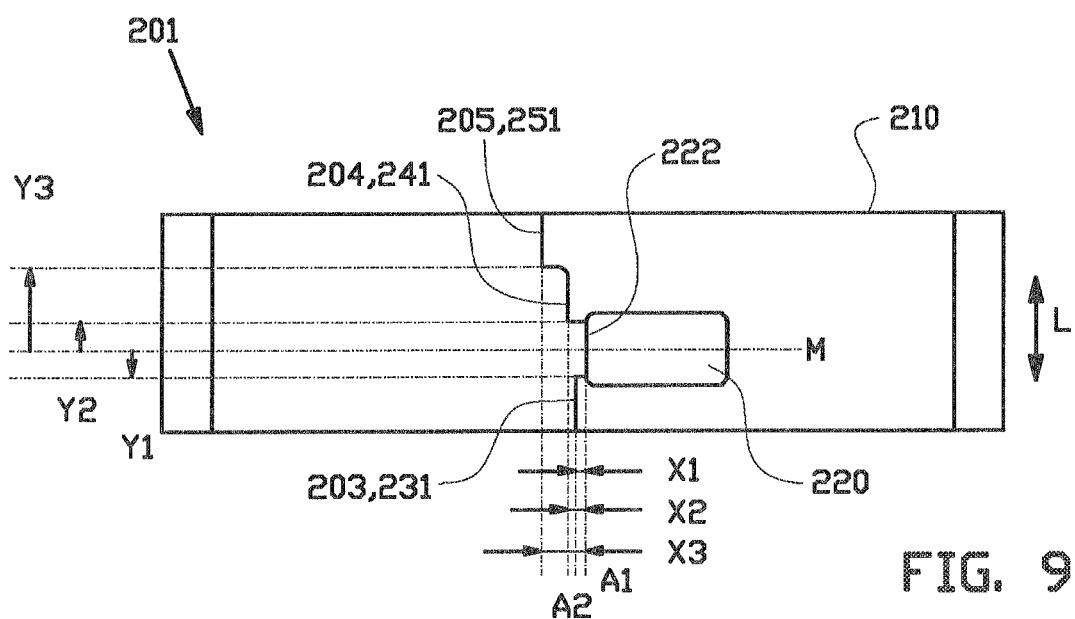
FIG. 9 shows a side view of the third validation tool according to FIG. 7.
Figure 10:
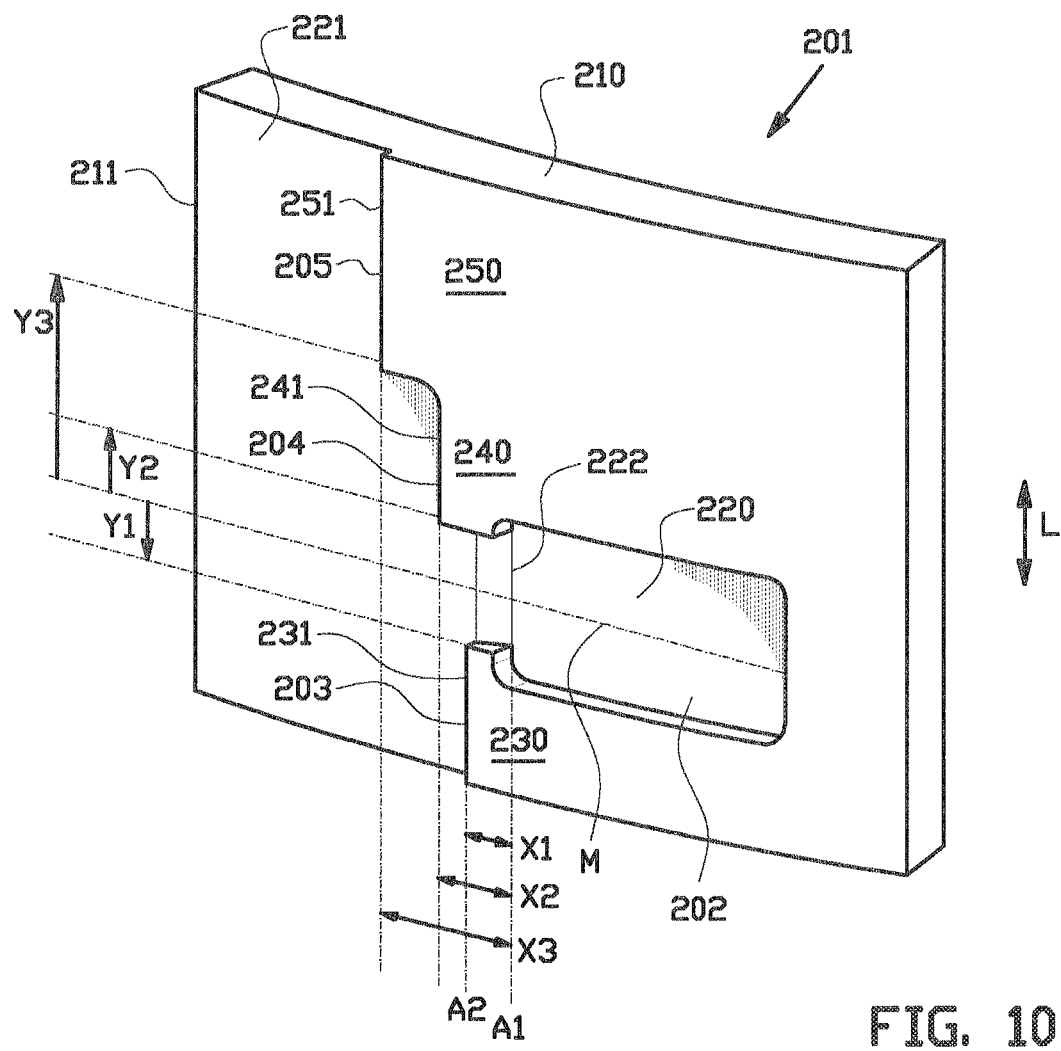
FIG. 10 shows a view in perspective of a detail of the third validation tool according to FIG. 7.

The third validation tool 201 is provided with a first reference element 202 representing the leading end LE of the tyre component 80 as shown in FIGS. 1A and 1B, and a second reference element 203 representing the trailing end TE of the tyre component 80 as shown in FIGS. 1A and 1B. As shown in FIGS. 9 and 10, the first reference element 202 comprises a recess 220 that extends at a first radius R1 that is equal to the first radius R1 of the circumferential surface 91 of the tyre building drum 9 in FIGS. 1A and 1B. The recess 220 is arranged to represent the circumferential surface 91 of the tyre building drum 9 as shown in FIG. 7. The first reference element 202 further comprises a first reference surface 221 extending at a second radius R2 radially outside the recess 220. The second radius R2 is equal to the first radius R1 plus the thickness T of the tyre component 80 which the third validation tool 201 is supposed to represent. The first reference element 202 further comprises a detectable slope or chamfered first reference edge 222 that forms the transition between the recess 220 and the first reference surface 221 of the third validation tool 201. The first reference edge 222 is formed at a boundary of or bounds the recess 222. The first reference edge 222 extends at the first angular position A1 and is arranged to represent the leading edge of the leading end LE of the tyre component 80 on top of the circumferential surface 91 of the tyre building drum 9 in FIGS. 1A and 1B.

The second reference element 203 comprises a second reference surface 230 extending at a third radius R3 equal to the second radius R2 plus another thickness T of the tyre component 80 which the third validation tool 201 is supposed to represent. The second reference surface 230 is arranged to represent the area or the part of the tyre component 80 at or near the trailing end TE, which part in practice overlaps the leading end LE at the splice in FIG. 1B. The reference surface 230 ends with a detectable second reference edge 231 that extends parallel to the first reference edge 222 at a first overlap distance X1 from said first reference edge 222. The second reference edge 231 preferably extends at the second angular position A2 and is arranged to represent the trailing edge of the trailing end TE of the tyre component 80 in FIG. 1B. When considered in the circumferential direction of the tyre building drum 9, the second reference surface 230 extends beyond the first reference edge 222 in the first angular position A1 and up to the second reference edge 231 at the second angular position A2.

To prevent that the second reference element 203, and in particular its reference surface 230, overlaps the first reference element 202 in the first angular position A1, as is the case with the trailing end TE and the leading end LE in practice, the second reference element 203 is offset over a known, preset or predetermined first translation offset Y1 with respect to the first reference element 202 in the longitudinal or axial direction L of the third validation tool 201 and the tyre building drum 9 to at least partially expose the first reference element 202. In this example, the first translation offset Y1 of the second reference element 203 with respect to the first reference element 202 is measured relative to the middle M of the first reference element 202 in the axial or longitudinal direction L.

In this exemplary embodiment, the third validation tool 201 is further provided with a third reference element 204 and a fourth reference element 205, each very similar to the second reference element 203 and arranged to represent alternative trailing edges of alternative trailing ends (not shown) with a different amount of overlap of said alternative trailing ends with respect to the leading end LE. In particular, the third reference element 204 comprises a third reference surface 240 extending at the third radius R3. The third reference surface 240 is arranged to represent the area or the part of the tyre component 80 at or near the alternative trailing end, which part in practice would overlap the leading end LE at the splice in FIG. 1B. The third reference surface 240 ends with a detectable third reference edge 241 that extends parallel to the first reference edge 222 at a second overlap distance X2 from said first reference edge 222. The fourth reference element 205 comprises a fourth reference surface 250 extending at the third radius R3. The fourth reference surface 250 is arranged to represent the area or the part of the tyre component 80 at or near the alternative trailing end, which part in practice would overlap the leading end LE at the splice in FIG. 1B. The fourth reference surface 250 ends with a detectable fourth reference edge 251 that extends parallel to the first reference edge 222 at a third overlap distance X3 from said first reference edge 222.

To prevent that the third reference element 204 and fourth reference element 205, and in particular the reference surfaces 240, 250 thereof, overlap the first reference element 202 in the first angular position A1, as would be the case with the alternative trailing ends and the leading end LE in practice, the third reference element 204 and the fourth reference element 205 are offset over a known, preset or predetermined second translation offset Y2 and third translation offset Y3, respectively, with respect to the first reference element 202 in the longitudinal or axial direction L of the third validation tool 201 and the tyre building drum 9 to at least partially expose the first reference element 202. In this example, the third reference element 204 and the fourth reference element 205 are located opposite to the second reference element 202 with respect to the middle M of the first reference element 202 in the axial or longitudinal direction L. The third reference element 204 and the fourth reference element 205 are sufficiently spaced apart to allow their respective reference edges 241, 251 to be detected independently.

Having a translation offset Y1, Y2, Y3 only, rather than an angular offset, ensures that the respective reference elements 203, 204, 205 are kept in the same angular position with respect to the first reference element 202. The reference elements 203, 204, 205 are thus in the same angular position as the characteristics of the tyre component 80 which they are supposed to represent. Virtually superimposing the measurements therefore only requires compensation for the translation offset Y1, Y2, Y3 in the axial/longitudinal direction L, rather than also compensating for an angular offset as with the first validation tool 1 and the second validation tool 101. Therefore, the measurements on the third validation tool 201 can be considered to be more pure and less subject to tolerances.

It is noted that the third validation tool 201, contrary to the first validation tool 1 and the second validation tool 101, is not placed in the same axial position in the axial or longitudinal direction L of the tyre building drum 9, but is mounted to the tyre building drum 9 or in this case the drum shaft 90, in a validation position adjacent to, alongside or to the side of the tyre building drum 9 or a drum half 9A in the longitudinal direction L. In this exemplary embodiment, the third validation tool 201 is clamped to the drum shaft 90 by a mounting member 206 that engages with the body 210 of the third validation tool 201.

The optical equipment, as shown in FIGS. 1A and 1B, is normally arranged in a plane that intersects radially with the tyre building drum 9 to observe the tyre components that are being applied to said drum 9. Therefore, the third validation tool 201 at the side of the drum 9 is initially out of viewing range. The tyre building drum 9 is normally movable in the longitudinal direction L with or over the drum shaft 90 to move between different tyre component servicers. This movability is used to move the third validation tool 201 together with the drum 9 in the longitudinal direction L to bring the third validation tool 201 within viewing range of the optical equipment (not shown). The third validation tool 201 can be moved in the longitudinal direction L during measuring to bring the individual reference elements 202, 203, 204, 205 into view. Alternatively, the optical equipment can be moved to the axial position of the third validation tool 201. The latter is less favorable, as it requires movement of the optical equipment which could present tolerances which can undermine the validation process. To detect the reference elements 202, 203, 204, 205, the third validation tool 201 is moved into a measuring position and optionally rotated relative to the optical equipment 7 of FIG. 1B.

Figure 8:
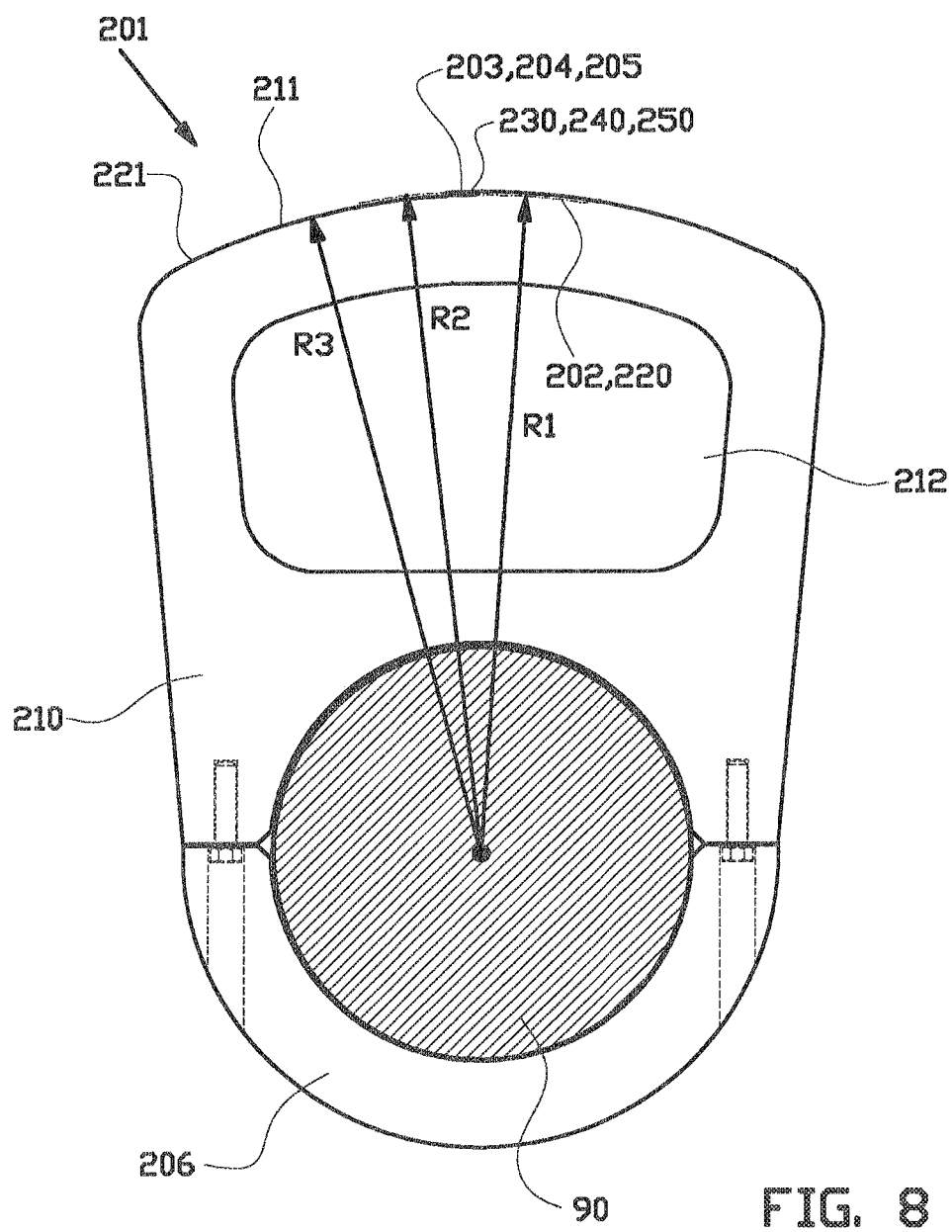
FIG. 8 shows a top view of the third validation tool according to FIG. 7.
Figure 11:
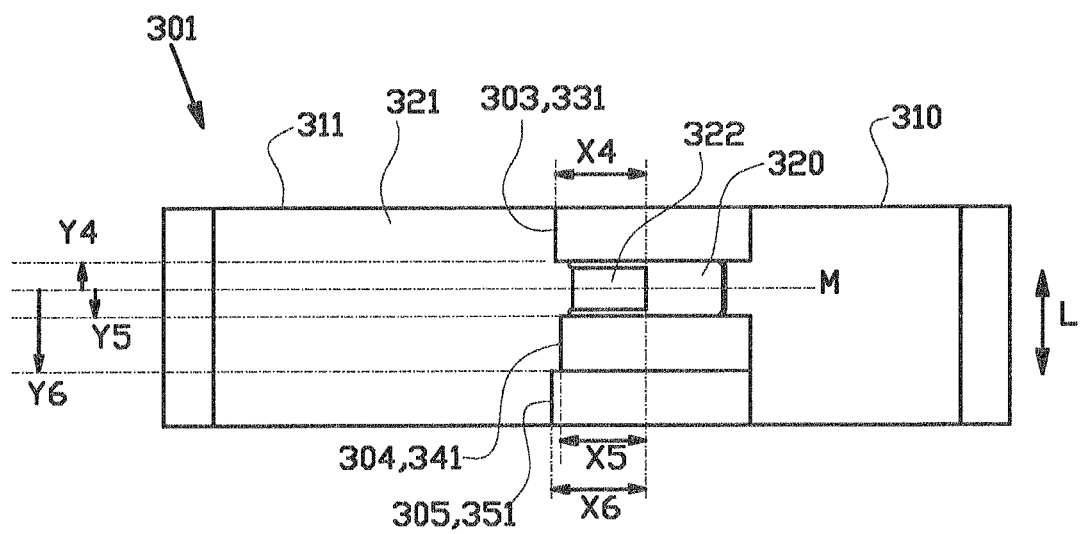
FIG. 11 shows a top view of a fourth validation tool according to a fourth embodiment of the invention.
Figure 12:
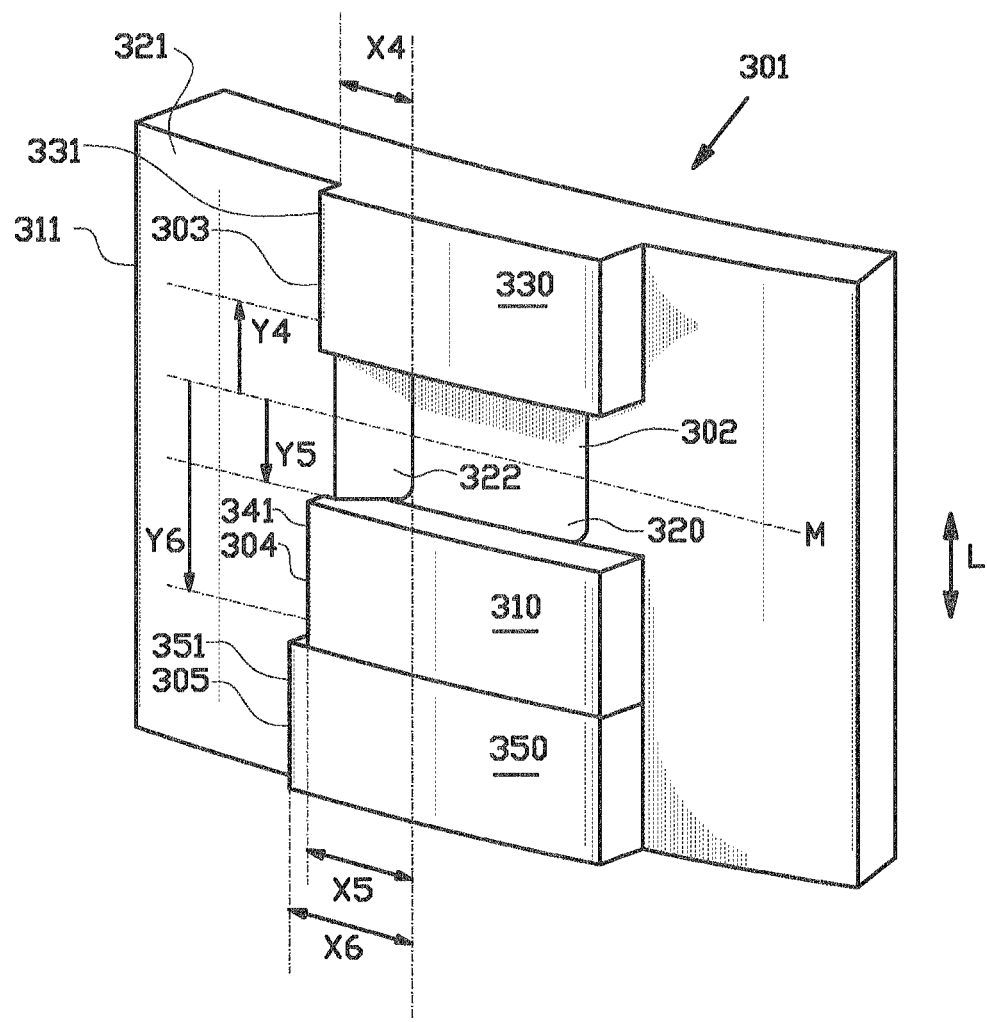
FIG. 12 shows a view in perspective of a detail of the fourth validation tool according to FIG. 11.

FIGS. 11, 12 and 13 show a fourth validation tool 301 according to a fourth embodiment of the invention. The fourth validation tool 301 has the same body 310 with a partial circumferential surface or splice validation area 311 as the body 210 of the third validation tool 201 as shown in FIGS. 7 and 8. At the splice validation area 311, the fourth validation tool 301 is provided with reference elements 302, 303, 304, 305. Each reference element 302, 303, 303, 304, 305 of the fourth validation tool 301 has a reference edge 322, 331, 341, 351 that is detectable with the optical equipment 7 of FIG. 1B. The first reference element 302 is provided with a recess 320 and a first reference surface 321. The other reference elements 303, 304, 305 are each provided with corresponding further reference surfaces 331, 341, 351 similar to those of the third validation tool 201. The fourth validation tool 301 differs from the third validation tool 201 in that the reference elements 302, 303, 304, 305 are arranged to represent characteristics of a different tyre component 80. In particular, the first reference edge 322 is formed as a sloped surface 322 that forms the transition between the recess 320 and the first reference surface 321. The sloped surface 322 is put at an inclination to represent a leading end LE of a tyre component 80 that has been cut at a very sharp angle to the plane of the tyre component 80, e.g. at only 20 degrees or less, typically with an ultrasonic knife.

Similar to the third validation tool 201, the second reference element 303, the third reference element 304 and the fourth reference element 305 are offset in the axial or longitudinal direction L over different translation offsets Y4, Y5, Y6 to expose the first reference element 302. The reference edges 331, 341, 351 of the aforementioned reference elements 303, 304, 305 are arranged to represent different trailing edges of alternative trailing ends (not shown) with a different amount of overlap X4, X5, X6 of said trailing ends with respect to the leading edge of the leading end LE (as represented by the first reference edge 322.

Optionally, the reference elements 202, 203, 204, 205 of the third validation tool 201 and the reference elements 302, 303, 304, 305 of the fourth validation tool 301 can be combined on a splice validation area of a single validation tool (not shown), e.g. by placing the reference elements 202, 203, 204, 205 of the third validation tool 201 in a first group and the reference elements 302, 303, 304, 305 of the fourth validation tool 301 in a second group, wherein the groups are spaced apart in the circumferential direction or placed in spaced apart angular positions on the splice validation area.

The foregoing description has illustrated various types of validation tools 1, 101, 201, 301 for verification or validation of the optical equipment 7 as shown in FIGS. 1A and 1B. The required offset between the reference elements 2, 3, 102, 103, 104, 202, 203, 204, 205, 302, 303, 304, 305 can be achieved by circumferential offset or translation offset or another offset that is for example based on a combination of both aforementioned offsets. As long as the amount of offset is known, the detected angular positions A1-A4 of the reference elements 2, 3, 102, 103, 104, 202, 203, 204, 205, 302, 303, 304, 305 can be virtually superimposed into a virtual position that corresponds to the actual angular positions of the characteristics of the tyre component 80 which the validation tool 1, 101, 201 is supposed to represent.

The reference elements 2, 3, 102, 103, 104, 202, 203, 204, 205, 302, 303, 304, 305 are preferably made out of material that is very rigid or inflexible, to reduce tolerances in the measurements. Preferably, the reference elements 2, 3, 102, 103, 104, 202, 203, 204, 205, 302, 303, 304, 305 are made of hard plastics or metal.

The validation tools 1, 101, 201, 301 as shown are used to verify or validate measurements representative of characteristics of a single tyre component 80. However, it will be apparent to one skilled in the art that the number of reference elements and the radius at which they extend can be adjusted, so that additional reference elements may represent characteristics of a further tyre component or further tyre components.

It is therefore to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A validation tool for validating optical equipment that is used for measuring a plurality of characteristics of one or more tyre components during a winding application of said tyre components around a tyre building drum, wherein a first tyre component of the one or more tyre components comprises a first characteristic of the plurality of characteristics which, after measuring, is overlapped by the same or another tyre component of the one or more tyre components comprising a second characteristic of the plurality of characteristics, wherein the validation tool is provided with a first reference element that is arranged to represent the first characteristic and a second reference element that is arranged to represent the second characteristic, wherein the second reference element is offset with respect to the first reference element to at least partially expose the first reference element.

2. The validation tool according to claim 1, wherein the second reference element is offset with respect to the first reference element in a direction corresponding to the circumferential direction of the tyre building drum.

3. The validation tool according to claim 2, wherein the first tyre component is cut under a cutting angle, wherein the first reference element and the second reference element extend along helical paths with a pitch that is representative of or equal to said cutting angle.

4. The validation tool according to claim 3, wherein the validation tool comprises a first group of reference elements, including at least the first reference element and the second reference element, wherein the validation tool further comprises a second group of reference elements that are mirror symmetrical to the reference elements of the first group.

5. The validation tool according to claim 3, wherein the validation tool comprises side references which are detectable by the optical equipment and which are arranged to represent the sides of the first tyre component.

6. The validation tool according to claim 5, wherein the first reference element and the second reference element intersect with the side references to form a triangular leading tip area and a triangular trailing tip area representative of the leading tip and the trailing tip, respectively, of the first tyre component.

7. The validation tool according to claim 3, wherein the second reference element is offset with respect to the first reference element in a direction corresponding to the circumferential direction of the tyre building drum, wherein the first reference element and the second reference element are offset in the circumferential direction over an offset angle in the range of 30 to 50 degrees.

8. The validation tool according to claim 3, wherein the second reference element is offset with respect to the first reference element in a direction corresponding to the circumferential direction of the tyre building drum, wherein the validation tool is provided with a third reference element comprising a second gap in the first reference surface, wherein the second gap is arranged to represent an alternative open splice between the leading end and the trailing end of the first tyre component.

9. The validation tool according to claim 8, wherein the second gap is bounded by a second auxiliary edge and a third auxiliary edge which extends parallel to the second auxiliary edge, both detectable by the optical equipment, wherein the distance between the second auxiliary edge and the third auxiliary edge is different from the distance between the first reference edge and the first auxiliary edge and represents the width of the alternative open splice.

10. The validation tool according to claim 2, wherein the validation tool comprises a body that is arranged to be mounted in the axial direction alongside the tyre building drum or, when the drum comprises two drum halves spaced apart in the axial direction, alongside one of the drum halves to extend generally in one radial direction of the tyre building drum towards the circumferential surface of the tyre building drum to form a splice validation area.

11. The validation tool according to claim 1, wherein the second reference element is offset with respect to the first reference element in a direction parallel to the axial direction of the tyre building drum.

12. The validation tool according to claim 11, wherein the validation tool comprises a third or further reference elements that are arranged to represent an alternative or further alternative trailing ends with different overlap distances with respect to the leading end than the trailing end as represented by the second reference element, wherein the third or further reference elements are offset with respect to both the first reference element and the second reference element in a direction parallel to the axial direction of the tyre building drum.

13. The validation tool according to claim 1, wherein the first characteristic is the leading end of the first tyre component.

14. The validation tool according to claim 13, wherein the first reference element comprises a first reference edge which is arranged to represent a leading edge of the leading end and which is detectable by the optical equipment.

15. The validation tool according to claim 14, wherein the tyre building drum comprises a drum shaft and a circumferential surface extending concentrically around the drum shaft at a first radius, wherein the validation tool comprises a first reference surface extending at a second radius that is greater than the first radius, wherein the first reference element is provided with a first gap or a recess in the first reference surface, wherein the first reference edge is formed at a boundary of said first gap or recess.

16. The validation tool according to claim 15, wherein the first gap or recess is arranged to represent an open splice between the leading end and the trailing end of the first tyre component.

17. The validation tool according to claim 16, wherein the first gap or recess is further bounded by a first auxiliary edge which extends parallel to the first reference edge at the second radius and which is detectable by the optical equipment, wherein the distance between the first reference edge and the first auxiliary edge represents the width of the represented open splice.

18. The validation tool according to claim 15, wherein the first gap or recess extends into the first reference surface down to the first radius.

19. The validation tool according to claim 15, wherein the second reference element comprises a second reference surface extending at a third radius that is greater than the second radius, wherein the wherein the second reference edge is formed at a boundary of said second reference surface.

20. The validation tool according to claim 13, wherein the first reference element comprises a reference slope which is arranged to represent a sloping leading end and which is detectable by the optical equipment.

21. The validation tool according to claim 13, wherein the second characteristic is the trailing end of the first tyre component.

22. The validation tool according to claim 21, wherein the second reference element comprises a second reference edge which is arranged to represent a trailing edge of the trailing end and which is detectable by the optical equipment.

23. The validation tool according to claim 1, wherein the validation tool comprises an annular body that is arranged to be fitted around the tyre building drum.

24. An assembly of a tyre building drum and the validation tool according to claim 1, wherein the tyre building drum comprises a drum shaft and a circumferential surface extending concentrically around the drum shaft, wherein the circumferential surface is arranged for supporting the one or more tyre components, wherein the validation tool is mounted in a validation position relative to the tyre building drum in which the first reference element and the second reference element are radially at substantially the same position as the respective characteristics which they are arranged to represent.

25. The assembly according to claim 24, wherein the validation tool comprises an annular body that is fitted around the tyre building drum.

26. The assembly according to claim 24, wherein the validation tool comprises a body that is mounted in the axial direction alongside the tyre building drum, or when the drum comprises two drum halves spaced apart in the axial direction, alongside one of the drum halves and extends generally in one radial direction of the tyre building drum towards the circumferential surface of the tyre building drum to form a splice validation area.

27. The assembly according to claim 26, wherein the tyre building drum is arranged to be movable in the axial direction defined by the drum shaft, wherein the validation tool is arranged to be movable in the axial direction together with the tyre building drum into the viewing range of the optical equipment.

28. The method for validating optical equipment with the validation tool according to claim 1, wherein the method comprises the steps of providing the validation tool in a validation position relative to the tyre building drum, using the optical equipment to obtain measurements from the first reference element and the second reference element and repeating the measurements to validate the optical equipment.

29. The method according to claim 28, wherein the method further comprises the step of virtually superimposing the measurements of the second reference element onto the measurements of the first reference element to arrive at a virtual splice.

\* \* \* \* \*